United States Patent [19]

Tischer

[11] Patent Number: 4,709,272

[45] Date of Patent: Nov. 24, 1987

[54] IMPLOSION PROTECTION FOR VIDEO REPRODUCING DEVICE

[75] Inventor: Kurt-Manfred Tischer, Wendlingen, Fed. Rep. of Germany

[73] Assignee: Standard Elektrik Lorenz, Stuttgart, Fed. Rep. of Germany

[21] Appl. No.: 873,901

[22] Filed: Jun. 13, 1986

[30] Foreign Application Priority Data

Jun. 14, 1985 [DE] Fed. Rep. of Germany ....... 3521315

[51] Int. Cl.[4] .............................................. H04M 5/65

[52] U.S. Cl. ..................................... 358/247; 313/478

[58] Field of Search ....................... 358/247, 245, 250; 313/478

[56] References Cited

U.S. PATENT DOCUMENTS 3,009,017 11/1961 Conner et al. ...................... 353/247

FOREIGN PATENT DOCUMENTS 1187742 2/1965 Fed. Rep. of Germany .

1362288 4/1964 France ............................... 358/247

*Primary Examiner*—Edward L. Coles, Sr.

*Attorney, Agent, or Firm*—Christie, Parker & Hale

[57] ABSTRACT

A video reproducing device having a flat screen loosely placed in a mounting frame. The flat screen supports an elastic safety sheet affixed thereto for providing implosion protection if the flat screen shatters. A space is created between the frame and the flat screen for accommodating a sealing compound and a thin glass plate protects the safety sheet from external objects.

16 Claims, 1 Drawing Figure

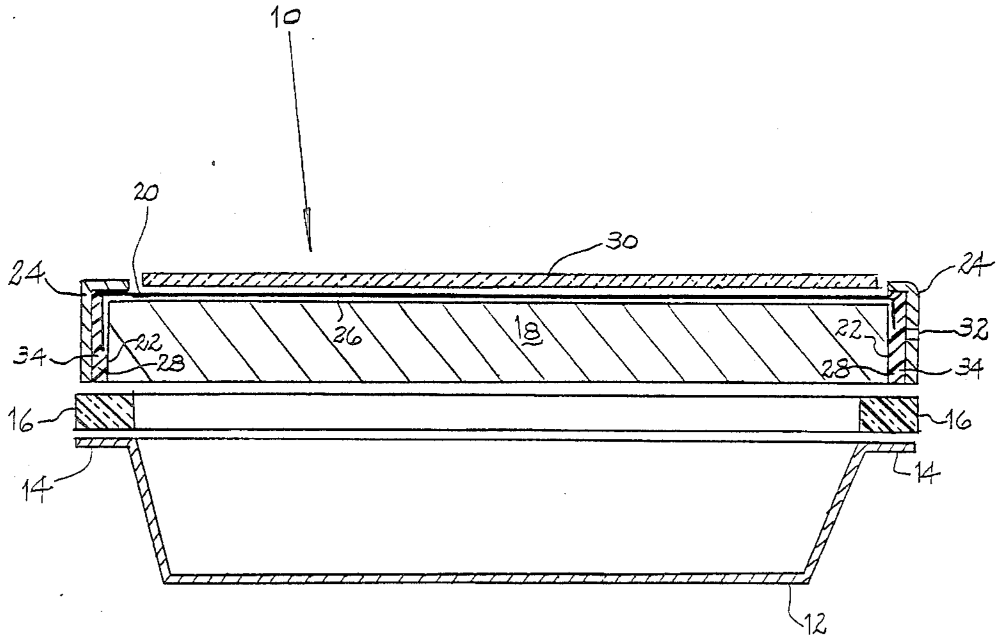
— Fig. 1 —

IMPLOSION PROTECTION FOR VIDEO REPRODUCING DEVICE

BACKGROUND OF THE INVENTION

1. Field of the Invention

The invention relates generally to video reproducing devices and more particularly to implosion protection for flat video reproducing devices.

2. Description of the Prior Art

In the field of video reproducing devices, responsible design safety should include implosion protection. If the screen of the video reproducing device should shatter, glass particles must be contained. In the prior art, implosion protection was achieved by placing a pretensioned glass system of the video reproducing device in a stress free environment by mechanical pressure exerted on the device by a tension band. In the German patent, DE-AS No. 11 87 742, a method of attaching a plastic sheet to the front surface of a cathode ray tube is disclosed. The cathode ray tube has a funnel section with a neck as its rear portion and a curved faceplate as its front portion. The plastic sheet is attached to the outside of the curved faceplate as in implosion protection. After the application of the plastic sheet, the circumference of the cathode ray tube is surrounded by a tension band which is subjected to a tensile stress of approximately 450 kg. The plastic sheet acts to contain the glass particles should the screen of the video reproducing device shatter. However, the implosion protection described by the prior art is employable only for video reproducing devices having a curved faceplate panel. There remains a demand for implosion protection for video reproducing devices having a flat faceplate panel.

SUMMARY OF THE PRESENT INVENTION

It is therefore an object of the present invention to provide an implosion protection system for a video reproducing device having a flat screen.

Briefly, a preferred embodiment of the present invention includes a video reproducing device having a flat screen loosely placed in a mounting frame. The flat screen supports an elastic safety sheet which is affixed to the flat screen for retaining glass particles if the flat screen should shatter. The mounting frame extends slightly over an external surface of the flat screen for creating a sealing space which accommodates a viscous, elastic sealing compound. The safety sheet is then covered with a thin glass plate for protection. This combination of structure acts to provide implosion protection for the video reproducing device having a flat screen.

An advantage of the flat screen video reproducing device of the present invention is that an implosion protection system is provided.

These and other objects and advantages of the present invention will no doubt become obvious to those of ordinary skill in the art after having read the following detailed description of the preferred embodiment(s) which are illustrated in the various drawing figures.

IN THE DRAWING

FIG. 1 is a cross-sectional view of a video reproducing device in accordance with the present invention.

DETAILED DESCRIPTION OF THE PREFERRED EMBODIMENT

FIG. 1 illustrates a video reproducing device referred to by the general reference character 10 and incorporating the present invention. The device 10 includes a metallic tub or envelope 12, a plurality of rim portions 14, and a spacing frame 16, a flat glass screen 18, a safety sheet 20, a plurality of side surfaces 22, a mounting frame 24, an external surface 26 of the flat screen 18, a viscous, elastic sealing compound 28, a thin glass plate 30, a plurality of access holes 32 and a sealing space 34.

The video reproducing device 10 includes as the rear portion the metallic tub or envelope 12 whose rim portions 14 are bent outwardly and serve as a support for the spacing frame 16. The flat glass screen 18 is placed on the spacing frame 16 and is employed to reproduce a video image. The associated cathodes, control structure and luminescent layer are not shown since these details are not necessary for the description of the implosion protection for the video reproducing device 10. The flat glass screen 18 supports the safety sheet 20, the ends of which extend onto the side surfaces 22 of the flat glass screen 18. The safety sheet 20 can be glued over the entire surface of the flat glass screen 18 or glued only at the plurality of side surfaces 22. Acrylate is an example of an acceptable adhesive for use in the instant invention. The safety sheet 20 is understood to be a sheet comprised of elastic which can retain glass particles if the flat glass screen 18 shatters. The safety sheet 20 can be comprised of a polyester such as polyethyleneterephthalate having a thickness in the range of (25 to 60) micrometers. Such a safety sheet 20 is available under the brandname "Sicherheitsfolie Tesa 4592". Around the flat glass screen 18, the mounting frame 24 is loosely placed. The upper end of the mounting frame 24 is L-shaped and bent in the direction of the external surface 26 of the flat glass screen 18 and extends slightly onto the external surface 26. The sealing space 34 is located between the mounting frame 24 and either of the side surfaces 22 of the flat glass screen 18 or the safety sheet 20. The sealing space 34 is filled with the viscous, elastic sealing compound 28 which can be polyurethane, for example. Since the safety sheet 20 is usually not resistant to scratches and solvents, it is covered with the thin glass plate 30. Either the safety sheet 20 or the thin glass plate 30 may be tinted to serve as a contrast plate. On the right side of the flat glass screen 18, the sealing space 34 is provided between the end of the mounting frame 24 which is bent towards the external surface 26 and the safety sheet 20. This sealing space 34 can then be filled with the sealing compound 28. However, as shown on the left side of the flat glass screen 18, the end of the mounting frame 24 can be supported directly by the safety sheet 20. The sealing compound 28 can be introduced from below the flat glass screen 18 into the sealing space 34 located between the flat glass screen 18 and the mounting frame 24. The mounting frame 24 can also include the plurality of access holes 32 through which the sealing compound 28 can be introduced.

During an implosion test of the video reproducing device 10 designed in the manner described herein, the flat glass screen 18 cracked at the point of maximum tension in the glass. The safety sheet 20 held the glass particles together and the mounting frame 24 damped the vibrations of the flat glass screen 18 such that the safety sheet 20 did not separate from the rim portions 14 of the metallic tub 12. This result indicates that the implosion protection system described hereinabove is adequate for a flat video reproducing device 10.

Additionally, the safety sheet 20 may be replaced by a plastic coating provided the thin glass plate of approximately 1 to 2 millimeters thickness is as large as the entire area enclosed by the upper rim of the mounting frame 24. The result is a composite system constructed in a similar fashion to safety glass.

Although the present invention has been described in terms of the presently preferred embodiments(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An implosion system for a flat video reproducing device comprising, in combination:

a shallow envelope, said shallow envelope having a rim portion;

a flat glass screen for reproducing a video image, said flat glass screen having an external surface, an internal surface, and a plurality of side surfaces, said internal surface being supported adjacent to said side surfaces by said rim portion of said envelope, said flat glass screen and said envelope defining an interior space for containing a vacuum;

a mounting frame surrounding said side surfaces of said flat glass screen and separated therefrom by a sealing space; and a sealing compound resident within said sealing space for dampening vibrations of the flat video reproducing device upon loss of said vacuum from said interior.

2. The implosion protection system of claim 1 further including a spacing frame located intermediate said rim portion and said flat glass screen for mounting said flat glass screen to said envelope.

3. The implosion protection system of claim 1 wherein said envelope is comprised of metal.

4. The implosion protection system of claim 3 wherein said spacing frame positions the flat glass screen above said metal envelope.

5. The implosion protection system of claim 1 wherein said sealing compound is a viscous, elastic material.

6. The implosion protection system of claim 1 wherein said sealing compound comprises polyurethane.

7. The implosion protection system of claim 1 wherein said mounting frame include a plurality of holes for injecting said sealing compound into said sealing space.

8. The implosion protection system of claim 1 further comprising a safety sheet supported by said flat glass screen for retaining glass particles upon implosion.

9. The implosion protection system of claim 8 further including a thin glass plate mounted upon said safety sheet for protecting said safety sheet.

10. The implosion protection system of claim 9 wherein said thin glass plate is tinted.

11. The implosion protection system of claim 8 wherein said safety sheet is tinted.

12. The implosion protection system of claim 8 wherein said safety sheet is glued to the flat glass screen.

13. The implosion protection system of claim 8 wherein said safety sheet is glued to said plurality of side surfaces.

14. The implosion protection system of claim 8 wherein said safety sheet comprises polyethyleneterephthalate having a thickness in the range of twenty-five to sixty micrometers.

15. The implosion protection system of claim 8 wherein said safety sheet is comprised of elastic.

16. The implosion protection system of claim 8 wherein said safety sheet is comprised of plastic.

* * * * *

UNITED STATES PATENT AND TRADEMARK OFFICE
CERTIFICATE OF CORRECTION

PATENT NO. : 4,709,272

DATED : November 24, 1987

INVENTOR(S) : Tischer

It is certified that error appears in the above-identified patent and that said Letters Patent is hereby corrected as shown below:

Column 3 Line 17 After "implosion" insert -- protection --

Signed and Sealed this

Sixteenth Day of August, 1988

*Attest:*

DONALD J. QUIGG

*Attesting Officer*

*Commissioner of Patents and Trademarks*